United States Patent
Yokouchi et al.

(10) Patent No.: US 7,564,563 B2
(45) Date of Patent: Jul. 21, 2009

(54) LASER GYRO AND ELECTRONIC DEVICE USING THE SAME

(75) Inventors: Noriyuki Yokouchi, Tokyo (JP); Junji Yoshida, Kyoto (JP); Takahisa Harayama, Kyoto (JP); Takehiro Fukushima, Kyoto (JP); Akihiko Kasukawa, Tokyo (JP); Shuichi Tamura, Kyoto (JP); Keizou Inagaki, Kyoto (JP); Morito Matsuoka, Kyoto (JP)

(73) Assignees: Advanced Telecommunications Research Institute International, Kyoto (JP); The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/806,486

(22) Filed: May 31, 2007

(65) Prior Publication Data

US 2007/0291273 A1 Dec. 20, 2007

(30) Foreign Application Priority Data

Jun. 2, 2006 (JP) .............................. 2006-154906
Jun. 22, 2006 (JP) .............................. 2006-172647

(51) Int. Cl.
*G01C 19/72* (2006.01)
(52) U.S. Cl. ..................................................... 356/461
(58) Field of Classification Search ................ 356/459, 356/460, 461
See application file for complete search history.

(56) References Cited

U.S. PATENT DOCUMENTS

| 5,408,492 | A | * | 4/1995 | Vossler et al. ................. 372/94 |
| 2002/0176087 | A1 | * | 11/2002 | Numai ....................... 356/461 |
| 2006/0039430 | A1 | | 2/2006 | Yamada et al. |

FOREIGN PATENT DOCUMENTS

| JP | 2000-230831 | 8/2000 |
| JP | 2004-319914 | 11/2004 |

OTHER PUBLICATIONS

Zou, W.X., et al., "Very-Low-Threshold, Strained $In_yGa_{1-y}As$-GaAs Quantum-Well Lasers Defined by Impurity-Induced Disordering", IEEE Photonics Technology Letters, May 1991, pp. 400-403, vol. 30-No. 5, IEEE.

Yu, S.F., et al., "Semiconductor Lasers Using Diffused Quantum-Well Structures", IEEE Journal of Selected Topics in Quantum Electronics, Jul./Aug. 1998, pp. 723-735, vol. 4 No. 4, IEEE.

* cited by examiner

*Primary Examiner*—Michael A Lyons
(74) *Attorney, Agent, or Firm*—McDermott Will & Emery LLP

(57) ABSTRACT

A laser gyro of the present invention includes laser light excitation means (a semiconductor laser device 100) that excites first and second laser lights propagating in the opposite directions to each other in a circular ring-shaped path (an optical path 40), coupling means (optical waveguides 41 and 42) for superimposing the first and the second laser lights, and a photodetector for observing an interference signal generated by the superimposed first and second laser lights.

5 Claims, 14 Drawing Sheets

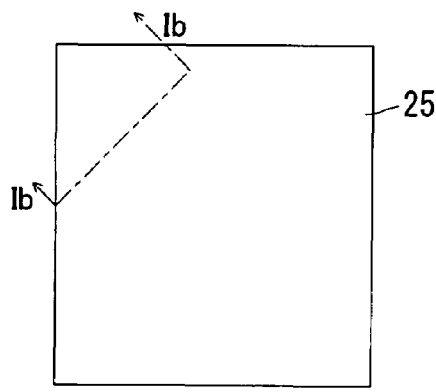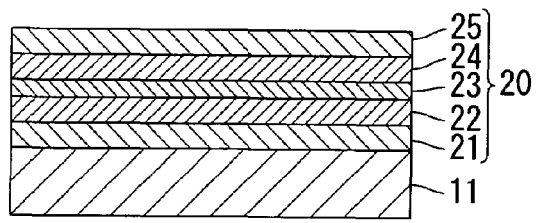
Fig. 1A    Fig. 1B
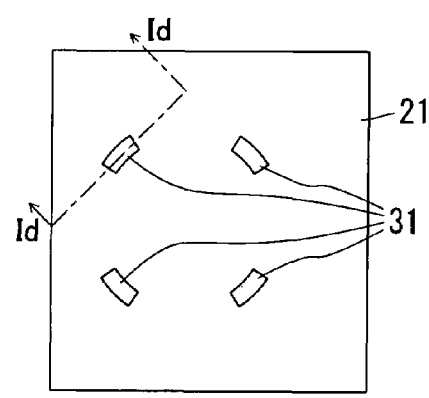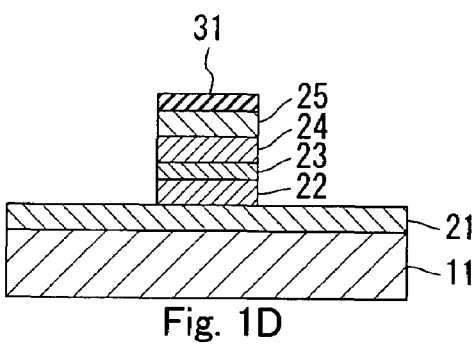
Fig. 1C    Fig. 1D
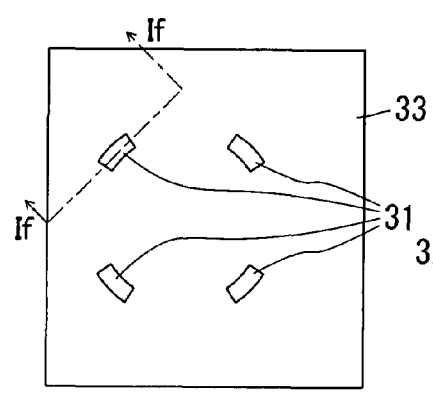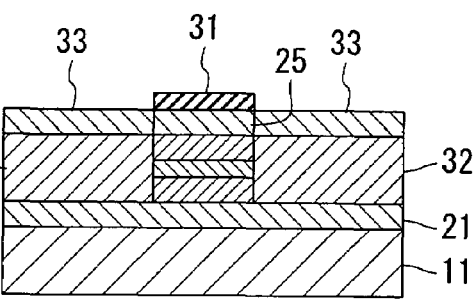
Fig. 1E    Fig. 1F
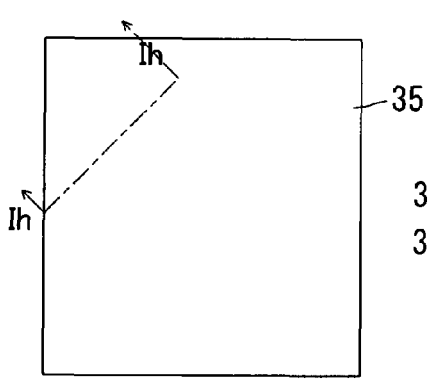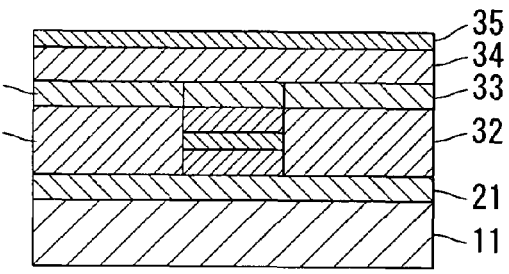
Fig. 1G    Fig. 1H

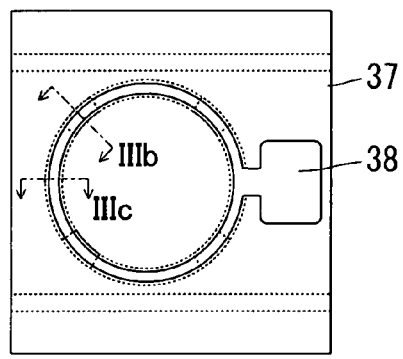
Fig. 3A
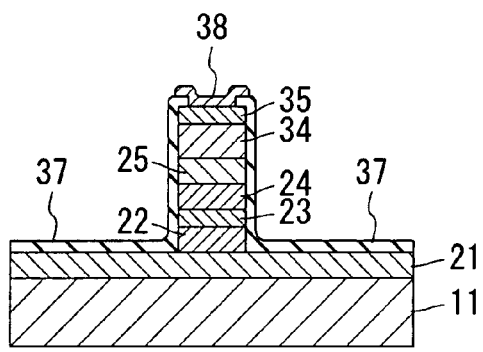 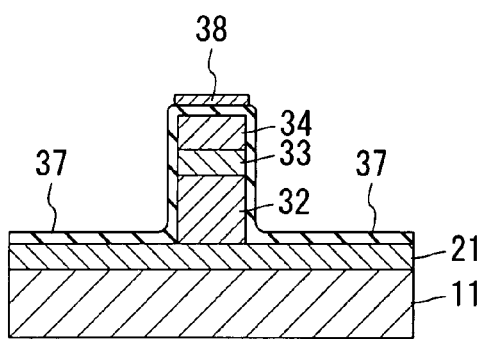
Fig. 3B        Fig. 3C
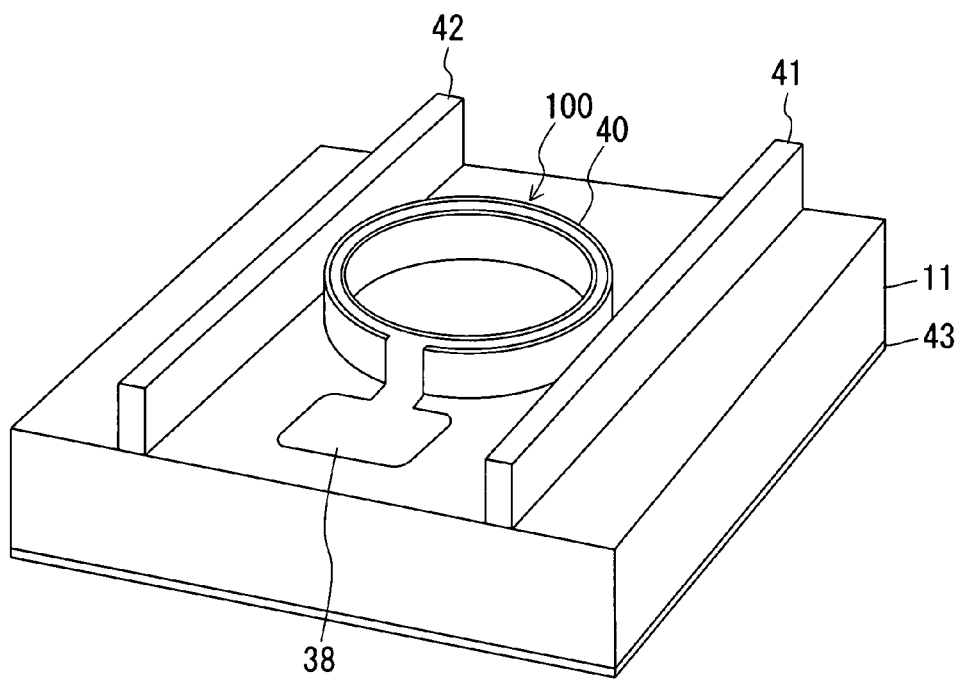
Fig. 4

LASER GYRO AND ELECTRONIC DEVICE USING THE SAME

BACKGROUND OF THE INVENTION

1. Field of the Invention

The present invention relates to a laser gyro and an electronic device using the same.

2. Related Background Art

Conventionally, optical gyros that use a semiconductor laser device provided with a ring-shaped active layer have been proposed (for example, JP2000-230831 A). Since a difference in frequency is generated (the Sagnac effect) between two laser lights that circulate in the opposite directions to each other in a ring-shaped active layer when a gyro rotates, rotation of the gyro can be detected by detecting the difference. The difference in frequency Δf between the two laser lights is expressed by the following Formula:

$$\Delta f = \frac{4A}{\lambda nL} \Omega$$

In the Formula, L denotes the circulation length of an optical path, A denotes the inner area of the optical path, λ denotes the wavelength of the laser light, n denotes the refractive index of the optical path and Ω denotes angular velocity.

Sensitivity of the gyro can be enhanced by increasing the difference in frequency between the two laser lights. As one of such measures, a measure is known which increases the A/L value by enlarging the size of the ring-shaped optical path.

However, enlarging the size of the ring-shaped optical path causes a problem in the semiconductor laser device where the threshold current becomes high and the power consumption increases.

SUMMARY OF THE INVENTION

With such a situation in mind, one of the objects of the present invention is to propose a novel laser gyro that can achieve high sensitivity and low power consumption.

In order to achieve the objects, a laser gyro of the present invention includes laser light excitation means that excites first and second laser lights propagating in the opposite directions to each other in a circular ring-shaped path, coupling means for superimposing the first and the second laser lights, and a photodetector for observing an interference signal generated by the superimposed first and second laser lights.

In a first laser gyro of the present invention, the laser light excitation means includes a semiconductor laser device having a circular ring-shaped resonator and generating the first and the second laser lights that propagate in the resonator in the opposite directions to each other, the coupling means extracts each of the first and the second laser lights from the resonator and superimposes them, and the resonator has a region generating optical amplification and a region not generating optical amplification.

From another prospective, the first laser gyro of the present invention includes a semiconductor laser device having a ring-shaped resonator and generating first and second laser lights propagating in the resonator in the opposite directions to each other, coupling means extracting each of the first and the second laser lights from the resonator and superimposes them, and a photodetector for observing an interference signal generated by the superimposed first and second laser lights. The resonator has a region generating optical amplification and a region not generating optical amplification.

In a second laser gyro of the present invention, the laser light excitation means includes a semiconductor laser device having a circular ring-shaped resonator and generating the first and the second laser lights that propagate in the resonator in the opposite directions to each other, the coupling means extracts each of the first and the second laser lights from the resonator and superimposes them, and the resonator has a region generating optical amplification and a region not generating optical amplification.

From another perspective, the second laser gyro of the present invention includes a substrate, a circular ring-shaped optical waveguide formed on the substrate, an optical coupler formed on the substrate, and a semiconductor optical amplifier and a photodetector both disposed on the substrate. The semiconductor optical amplifier is coupled to the circular ring-shaped optical waveguide so that the semiconductor optical amplifier and the circular ring-shaped optical waveguide form a circular ring-shaped optical path. The semiconductor optical amplifier and the circular ring-shaped optical waveguide generate a first laser light propagating clockwise in the optical path and a second laser light propagating counterclockwise in the optical path. The optical coupler extracts the first and the second laser lights from the circular ring-shaped optical waveguide and superimposes them. The photodetector observes a beat signal generated by the superimposed first and second laser lights. The expression "formed (or disposed) on a substrate" includes a case in which the subject matter is directly formed (or disposed) on the substrate, and it further includes a case in which the subject matter is formed (or disposed) on the substrate via certain layer.

An electronic device of the present invention includes the laser gyro of the present invention.

The first laser gyro of the present invention can achieve high sensitivity and low power consumption.

In the second laser gyro of the present invention, a circular ring-shaped optical path (an optical waveguide) can be formed using a material absorbing less laser light. Thus, it can be driven by low power.

The second laser gyro of the present invention also can be formed by mounting a semiconductor optical amplifier and a photodetector on a substrate on which an optical waveguide is formed. Accordingly, it enables an easy manufacture.

In addition, since the optical waveguide and the optical coupler used in the second laser gyro of the present invention can be formed on an identical substrate by techniques used for semiconductor device manufacturing processes (such as lithography and dry etching), it can be formed in a small size with higher accuracy. Thus, according to the present invention, it is possible to obtain a laser gyro in a small size with higher performance.

BRIEF DESCRIPTION OF THE DRAWINGS

FIGS. 1A to 1H show steps of an example of a method of manufacturing the first laser gyro of the present invention.

FIGS. 3A to 3C show steps following FIG. 2F.

FIG. 4 is a perspective view that schematically shows a part of a laser gyro manufactured by the method of FIGS. 1A to 3C.

DETAILED DESCRIPTION OF THE INVENTION

Figure 2A:
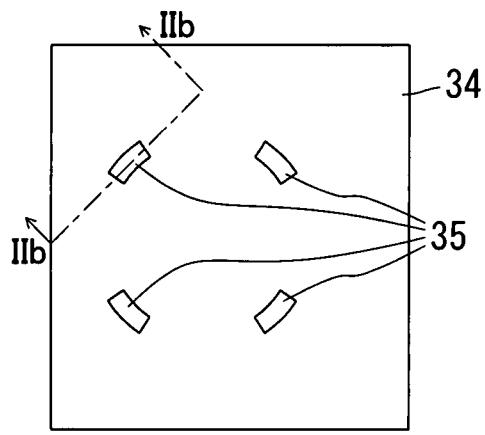
FIGS. 2A to 2F show steps following FIG. 1H.

Hereinbelow, the present invention is described with examples. It should be noted, though, that the present invention is not limited to the examples below. For example, although the description below may mention specific materials or numeric values by way of example, other materials or values may be applied as long as the effects of the present invention are obtained.

[Laser Gyro]

The laser gyro of the present invention includes laser light excitation means, coupling means and a photodetector. The laser light excitation means excites first and second laser lights propagating in the opposite directions to each other in a circular ring-shaped path. The coupling means superimposes the first and the second laser lights. The photodetector observes an interference signal generated by the superimposed first and second laser lights.

[First Laser Gyro]

Hereinbelow, the first laser gyro of the present invention is described.

The laser gyro of the present invention includes a semiconductor laser device, coupling means and a photodetector. The laser gyro of the present invention may include other optical and electronic devices as needed.

The semiconductor laser device has a ring-shaped (circular ring-shaped) resonator and generates first and second laser lights that propagate in the resonator in the opposite directions to each other. The resonator has a region generating optical amplification (an active region) and a region not generating optical amplification (a passive region).

The ratio of the length of the active region in the peripheral length of the resonator is, for example, in a range from 10% to 90%, and an example of the ratio is in a range from 20% to 70%.

In the active region, a semiconductor multilayer film functioning as an emission region of the semiconductor laser device and an electrode for injecting a current into the active layer in the semiconductor multilayer film are disposed. The active region may be formed in one part or a plurality of parts in the ring-shaped resonator. In the active region, the carrier injection into the active layer causes stimulated emission for amplifying the lights. On the other hand, the lights are not amplified in the passive region.

In order to prevent the laser lights from attenuating in the passive region, a band gap of a semiconductor layer constructing the region not generating optical amplification (passive region) is preferably wider than that of a semiconductor layer constructing the region generating optical amplification (active region). According to this construction, a laser light generated in the active region can be prevented from being absorbed in the passive region.

The coupling means extracts each of the first and the second laser lights from the ring-shaped resonator and superimposes them. This coupling means includes light extracting means for extracting the first and the second laser lights from the ring-shaped resonator and superimposing means for superimposing the first and the second laser lights that are extracted.

The light extracting means may be, for example, one or two optical waveguides disposed in a predetermined position. The coupling means may include an optical waveguide, as light extracting means, disposed adjacent to the resonator and parallel to a tangential direction of the resonator. Since the optical waveguide functions as an optical coupler, the first and the second laser lights propagate from the resonator to the optical waveguide. The shortest distance between the resonator and the optical waveguide for extracting light is, for example, in a range from 0.1 µm to 1 µm.

The superimposing means may be an optical coupler constructed by two optical waveguides adjacent to each other. When both the light extracting means and the superimposing means are constructed by optical waveguides, it is also possible to construct all of them into one or two optical waveguides. The superimposing means included in the coupling means also may be an optical device other than an optical waveguide (such as a prism).

The photodetector is a device for observing the interference signal generated by the superimposed first and second laser lights. The photodetector includes one or a plurality of light-sensitive elements. The interference signal may be a beat signal or interference fringes. When the interference signal is interference fringes, the moving direction and moving speed of the interference fringes can be detected by using the photodetector having a plurality of light-sensitive elements. The rotation direction of the gyro can be determined based on the moving direction of the interference fringes, and the rotation speed of the gyro can be calculated based on the moving speed of the interference fringes. The light-sensitive elements can employ a photodiode, a phototransistor or the like.

AN EXAMPLE OF LASER GYRO

GaInAsP/InP-based materials do not cause a problem of oxidation at a regrowth interface. Accordingly, a passive optical waveguide can be connected by a butt-joint structure using a method such as Metalorganic Chemical Vapor Deposition (MOCVD). An example of the gyro having the ring resonator using a butt-joint structure is illustrated below with reference to FIGS. 1A to 5. FIGS. 1A to 4 show only the neighboring area of the resonator. FIG. 1A is a top view, and FIG. 1B is a cross-sectional view taken along the line Ib-Ib in FIG. 1A. Similarly, FIGS. 1C, 1E, 2A, 2C and 2E are top views, and FIGS. 1D, 1F, 1H, 2B, 2D and 2F are the cross-sectional views of these. FIG. 3A is a top view, and FIGS. 3B and 3C are the cross-sectional views of it.

The manufacturing steps are illustrated with reference to FIGS. 1A to 1H. First, a multilayer film 20 is formed on a substrate 11 using MOCVD as shown in FIGS. 1A and 1B. The multilayer film 20 includes a multiple quantum well structure. A part of this multilayer film 20 becomes an active region.

N-type InP is used for the substrate 11. On this substrate 11, an n-InP buffer layer 21 (amount of n-type dopant: $1\times10^{18}$ $cm^{-3}$, thickness: 0.5 μm) is grown. Next, four GaInAsP layers (all undoped, thickness of each layer: 10 nm) having each band gap wavelength of 0.95 μm, 1.0 μm, 1.05 μm and 1.1 μm respectively are grown in this order to form a GaInAsP layer 22.

Next, a multiple quantum well layer 23 made of a six repetition of GaInAsP/GaInAsP is formed. The well layer employs a GaInAsP layer (undoped, thickness: 7 nm) having a compressive strain of 1%. The barrier layer employs a GaInAsP layer (undoped, thickness: 10 nm) whose lattice matches InP and has a band gap wavelength of 1.1 μm. The composition of the well layer is defined to have the emission wavelength of 1.3 μm.

Then, four GaInAsP layers (all undoped, thickness of each layer: 10 nm) having each band gap wavelength of 1.1 μm, 1.05 μm, 1.0 μm and 0.95 μm respectively were grown in this order to form a GaInAsP layer 24. The GaInAsP layers 22 and 24 function as light confining layers.

Lastly, a p-type InP clad layer 25 (amount of p-type dopant: $1\times10^{17}$ $cm^{-3}$, thickness: 0.2 μm) is grown. In this way, the multilayer film 20 is formed.

Subsequently, as shown in FIGS. 1C and 1D, an $SiN_x$ thin film 31 is formed on each surface of the parts to be the active regions, and then the regions other than those parts are removed by etching. In specific, firstly, an $SiN_x$ thin film is formed on the entire surface of the multilayer film 20 by plasma CVD, followed by forming a resist film, by photolithography, on each part to be the active region. Next, the $SiN_x$ thin film in the regions not protected by the resist is removed by Reactive Ion Etching (RIE) using $CF_4$ gas to form the $SiN_x$ thin film 31. In each region where the $SiN_x$ thin film 31 is not formed, a surface of the p-type InP clad layer 25 is exposed. Then, after removing the photoresist by RIE using oxygen gas, the p-type InP clad layer 25 is etched using a mixture of hydrochloric acid/phosphoric acid, and the GaInAsP layers 22 and 24 and the multiple quantum well layer 23 are etched using a mixture of sulfuric acid/hydrogen peroxide aqueous solution/water. In this way, the structure of FIGS. 1C and 1D is formed.

Subsequently, as shown in FIGS. 1E and 1F, an undoped GaInAsP layer 32 having a band gap wavelength of 1.1 μm (thickness: 0.25 μm) and an undoped InP layer 33 (thickness: 0.1 μm) are grown by MOCVD in the etched regions.

Subsequently, the $SiN_x$ thin film 31 is removed by buffered hydrofluoric acid (BHF). Then, as shown in FIGS. 1G and 1H, a p-InP clad layer 34 (amount of p-type dopant: from $5\times10^{17}$ $cm^{-3}$ to $1\times10^{18}$ $cm^{-3}$, thickness: 2 μm) and a $p^+$-GaInAsP contact layer 35 (a band gap wavelength: 1.3 μm, amount of p-type dopant: $3\times10^{18}$ $cm^{-3}$, thickness: 0.1 μm) are formed by MODVD on the entire surface of the layered film. The InP buffer layer 21, the GaInAsP layer 32, the InP layer 33 and the InP clad layer 34 construct optical waveguides in the passive regions.

Figure 2B:
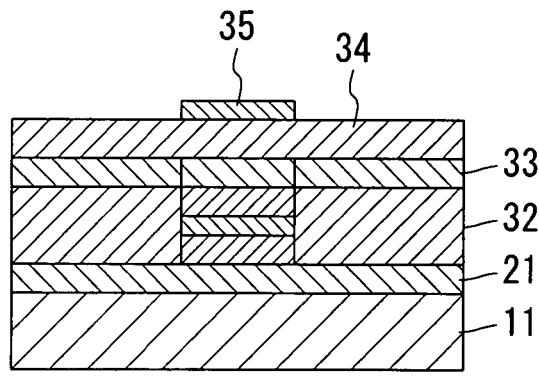

Subsequently, as shown in FIGS. 2A and 2B, the contact layer 35 is removed from the region other than that to be each active region. The contact layer 35 is selectively removed by the following procedure. First, an $SiN_x$ film is formed by plasma CVD on the entire upper surface of the layered film. Next, a photoresist pattern is formed by photolithography to cover the region to be each active region. Then, the $SiN_x$ film is patterned by RIE using $CF_4$ gas, followed by removing the resist by RIE using oxygen gas. After that, the contact layer 35 is etched using a mixture of sulfuric acid/hydrogen peroxide solution/water in the region where the $SiN_x$ film is not formed. Then, the $SiN_x$ film is removed by RIE using $CF_4$ gas. In this way, the structure of FIGS. 2A and 2B is formed. This ring-shaped resonator is constructed by four active regions and four passive regions.

Figure 2C:
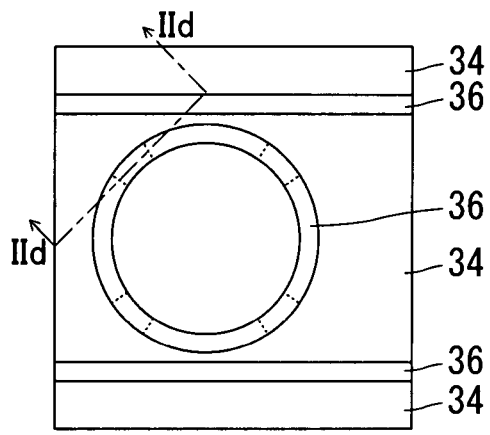
Figure 2D:
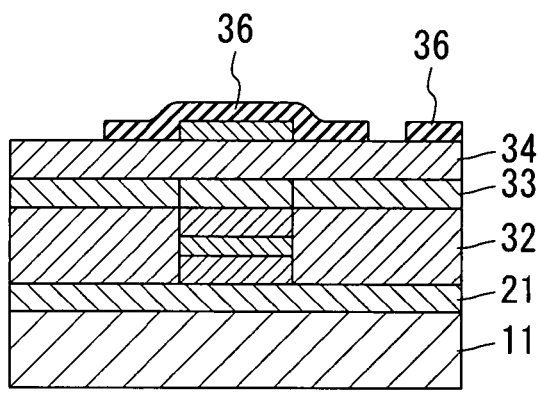

Subsequently, as shown in FIGS. 2C and 2D, an $SiN_x$ film 36 is formed in a ring-shaped region over the active regions and in the regions where the optical waveguides for extracting light to be formed.

Figure 2E:
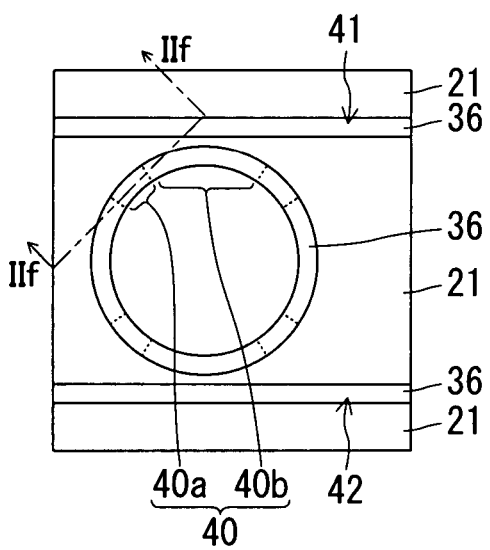
Figure 2F:
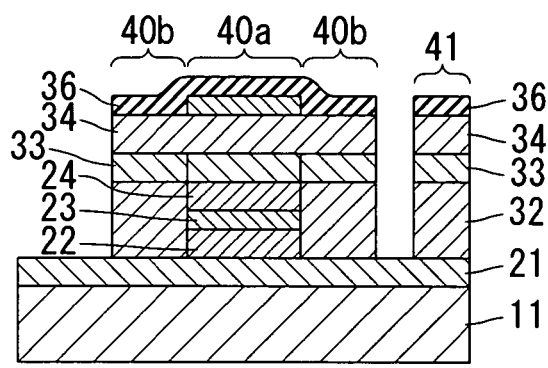

Subsequently, the region where the $SiN_x$ film 36 is not formed is etched through the lower surface of the GaInAsP layer 32 by dry etching using chlorine gas (such as etching using Inductively Coupled Plasma; ICP). In this way, as shown in FIGS. 2E and 2F, a ring-shaped optical path (a resonator) 40 and optical waveguides for extracting light 41 and 42 are formed. A part of the optical waveguide 41 is close to the optical path 40, and that part is parallel to the tangential direction of the optical path 40. Similarly, a part of the optical waveguide 42 is close to the optical path 40, and that part is parallel to the tangential direction of the optical path 40.

As an example, this optical path 40 has a radius of 1.5 mm and a width of 2 μm. The optical path 40 is constructed by four active regions 40a in each of which the multiple quantum well layer 23 exists and four passive regions 40b in each of which not the multiple quantum well layer 23 but the GaInAsP layer 32 exists. The multiple quantum well layer 23 of each active region 40a and the GaInAsP layer 32 of each passive region 40b are coupled by a butt joint.

Next, after removing the $SiN_x$ film 36 by RIE using $CF_4$ gas, an $SiN_x$ film is formed by plasma CVD on the entire surface over the substrate. Next, a part of the $SiN_x$ film over each active region 40a is removed by a photolithography-etching process to form a window. After that, the resist used in the photolithography-etching process is removed by RIE using oxygen gas.

Then, an electrode 38 in a shape shown in FIG. 3A is formed by a lift-off process to cover the window formed of the $SiN_x$ film 37. A cross-sectional view of one of the active regions 40a (a cross-sectional view taken along the line 111b in FIG. 3A) is shown in FIG. 3B, and that of one of the passive regions 40b (a cross-sectional view taken along the line 111c in FIG. 3A) is shown in FIG. 3C. As shown in FIG. 3B, the electrode 38 makes contact with the semiconductor layer in each active region 40a. On the other hand, as shown in FIG. 3C, the electrode 38 does not make contact with the semiconductor layer in each passive region 40b. Accordingly, a current is injected substantially only to the active regions 40a. The electrode 38 can be formed by depositing Ti/Pt/Au by electron-beam evaporation and then by lifting off the unnecessary parts. The electrode 38 includes a pad portion (size: about 100 μm square) for bonding a wire for wiring.

Subsequently, the backside of the substrate 11 is polished until the thickness of the substrate 11 becomes about 150 μm. Then, a backside electrode having an AuGeNi/Au structure is formed on the backside of the substrate 11. FIG. 4 schematically shows a perspective view of a part of the ring laser gyro thus formed. A backside electrode 43 is formed on the backside of the substrate 11 of the gyro in FIG. 4. In this way, a semiconductor laser device 100 and light extracting means are completed.

Figure 5:
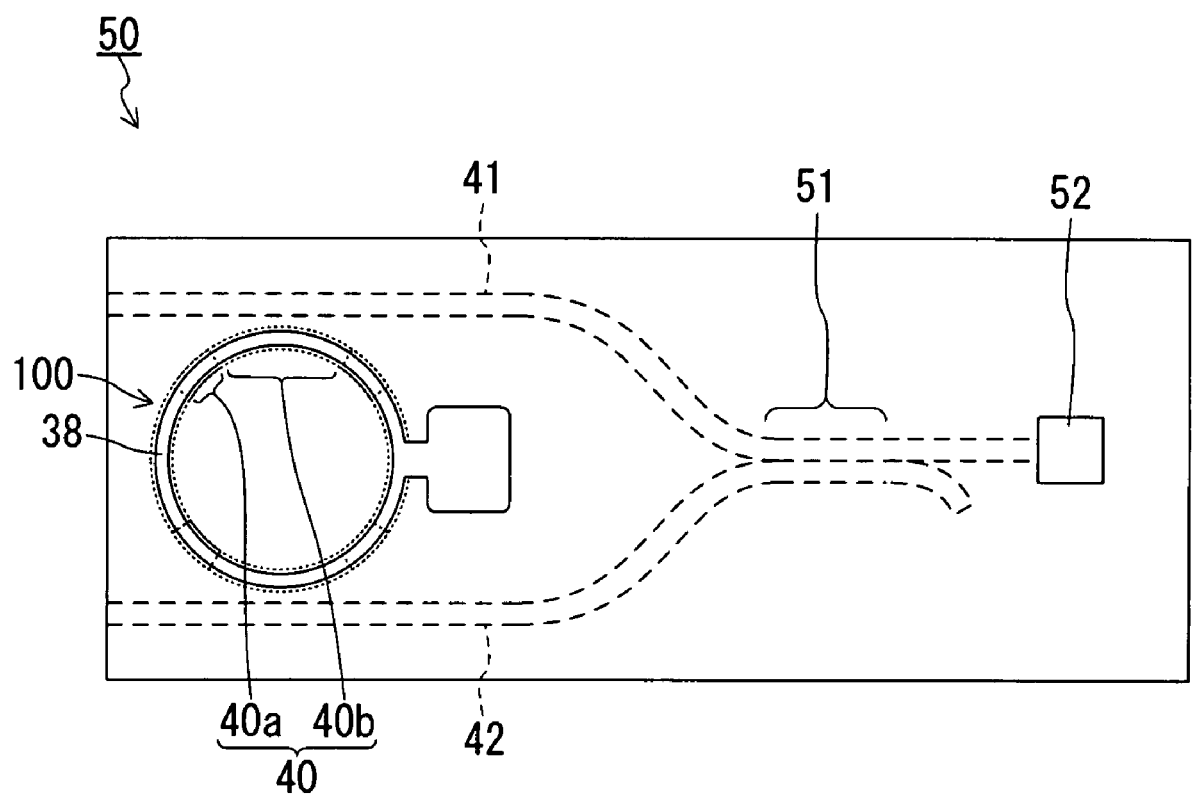
FIG. 5 is a plan view that schematically shows an entire laser gyro manufactured by the method of FIGS. 1A to 3C.

The laser gyro of the present invention includes superimposing means for superimposing the first and the second lasers that propagate in the optical waveguides 41 and 42. For example, the gyro of the present invention may include a directional coupler. FIG. 5 shows a plan view of an example of the gyro having a directional coupler. In a gyro 50 in FIG. 5, the optical waveguides 41 and 42 are disposed to have a part of them parallel and close to each other, so that this part functions as a directional coupler 51. That is, a part of the laser light traveling in the optical waveguide 41 propagates into the optical waveguide 42, and a part of the laser light traveling the optical waveguide 42 propagates into the optical waveguide 41. The shortest distance between the optical waveguides 41 and 42 in the directional coupler 51 is, for example, in a range from 0.1 μm to 1 μm.

An interference signal (beat signal) of the first and second laser lights superimposed by the directional coupler 51 is detected by a photodetector 52 disposed at an end of the optical waveguide 41. The frequency of this beat signal enables calculating the rotation speed of the gyro. Such directional coupler 51 can be formed by using a mask in a predetermined shape when forming the optical waveguides 41 and 42 by etching. The photodetector 52 may be mounted so as to optically couple to an end face of the optical waveguide 41. The photodetector may be mounted in a concave portion formed by etching the semiconductor layered film as needed (and the substrate, as needed).

In the first laser gyro, the semiconductor laser device may include an active layer having a quantum well structure and the peripheral length of the resonator may be more than 60 μm. The number of the well layer included in the active layer may be in a range from one to six.

In addition, in the first laser gyro, the semiconductor laser device may include an active layer having a quantum well structure and the peripheral length of the resonator may be more than 550 μm.

Regarding the first laser gyro, a relationship between the peripheral length of the ring laser and a threshold current was simulated. In this simulation, the length of the active regions in the peripheral length of the resonator was assumed to be 30%, and the length of the passive regions in the peripheral length of the resonator was assumed to be 70%. The number of the quantum wells was assumed to be three. The width of the active layer was assumed to be 2 μm. For comparison, a case was also simulated in which the entire resonator was the active region.

Figure 6:
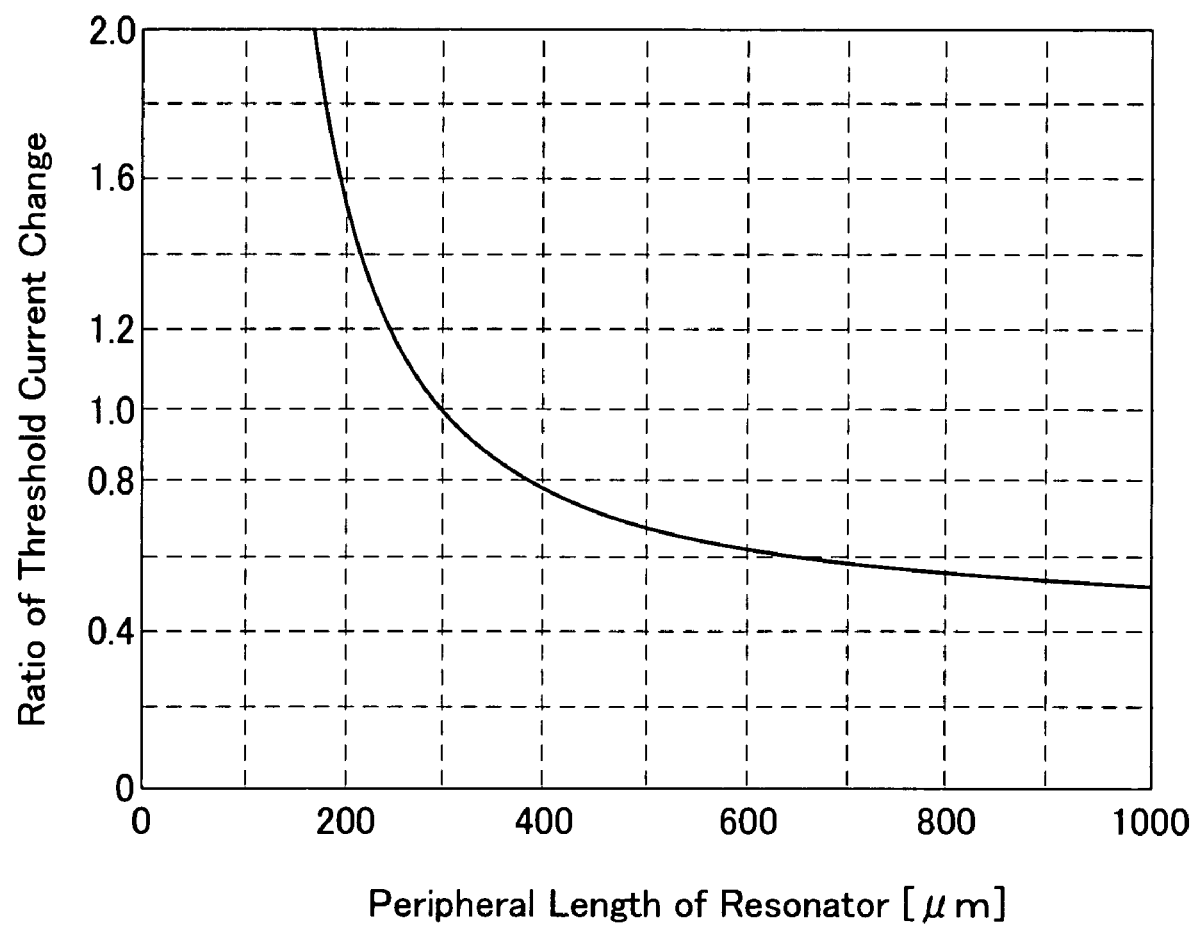
FIG. 6 shows results of a simulation on a relationship between a threshold current and a peripheral length of a ring laser, regarding the first laser gyro.

FIG. 6 shows results of the simulation. "Ratio of Threshold Current Change" on the vertical axis of the FIG. 6 is expressed by the following Formula:

[Ratio of Threshold Current Change]=[Threshold Current when Active Regions Occupy 30% of Resonator]/[Threshold Current when the Entire Resonator is Active Region]

As is clear from FIG. 6, the Ratio of Threshold Current Change can be less than 1 by making the peripheral length of the resonator more than 300 μm. That is, when the active regions occupy 30% of the resonator, the threshold current can be reduced by making the peripheral length of the resonator more than 300 μm.

Figure 7:
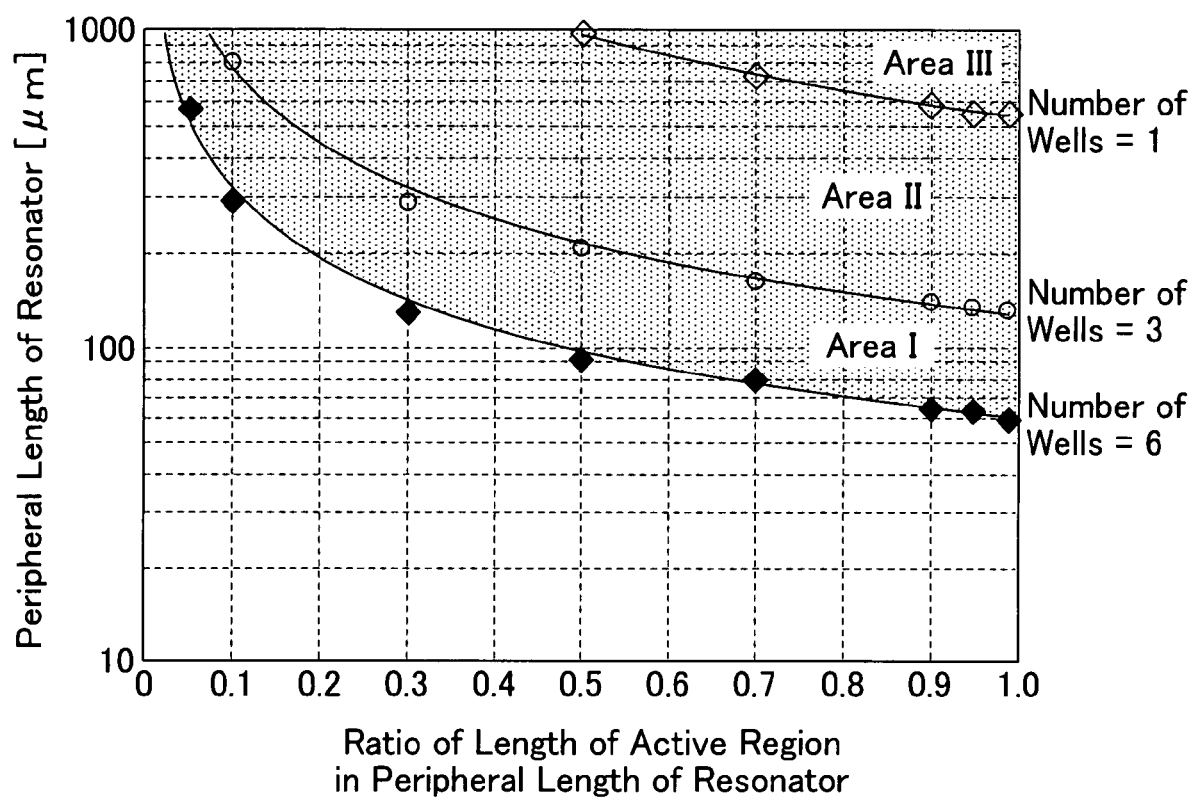
FIG. 7 shows results of a simulation on a relationship among a threshold current, a peripheral length of a resonator and a ratio of an active region length in a peripheral length of the resonator, regarding the first laser gyro.

In addition, regarding the first laser gyro, a relationship was simulated between the threshold current and a ratio of the length of the active region in the peripheral length of the resonator. FIG. 7 shows results of the simulation.

The curves in the graph of FIG. 7 show the positions where the threshold current agrees with the threshold current of the semiconductor laser device in which the entire resonator is the active region. FIG. 7 shows the curves when the numbers of the well(s) in the active layer having a quantum well structure is one, three and six. The curves shown in FIG. 7 are represented by the following approximate expression:

$$L = A \cdot r^{-B}$$

In the expression, L represents the peripheral length of the resonator, and r represents the ratio of the length of the active regions in the peripheral length of the resonator. The constants A and B are shown in Table 1.

TABLE 1

| Number of Well(s) | A | B |
|---|---|---|
| 1 | 532.92 | −0.8695 |
| 3 | 125.84 | −0.7812 |
| 6 | 59.12 | −0.726 |

In the graph of FIG. 7, the shaded area is an area where the threshold current becomes less than the threshold current of the semiconductor laser device in which the entire resonator is the active region. In FIG. 7, the area above the curve for six wells is called Area I. The area above the curve for three wells is called Area II. The area above the curve for one well is called Area III.

When using a quantum well structure having six or more wells, as shown in the Area I, the threshold current can be reduced by making the peripheral length of the resonator more than 60 μm. When using a quantum well structure having three or more wells, as shown in the Area II, the threshold current can be reduced by making the peripheral length of the resonator more than 130 μm. Particularly in the Area III, the threshold current can be reduced regardless of the number of wells (i.e., when using an arbitrary number of wells) by making the peripheral length of the resonator more than 550 μm.

ANOTHER EXAMPLE OF LASER GYRO

Although difficult to form the butt-joint structure, GaAs-based materials including Al can make a quantum well structure transparent by diffusing impurities. For example, the band gap can be made wider (i.e., transparent) by thermally diffusing impurities, such as Si, Zn and oxygen selectively, in a specific region of the epitaxial layer (for example, W. X. Zou et al., IEEE Photonics Technology Letters, vol. 3, no. 5, 400, 1991).

A method may be used as well which is called as Impurity Free Vacancy Diffusion; IFVD (for example, S.-F. Yu et al., IEEE Journal of Selected Topics in Quantum Electronics, vol. 4, no. 4, 723, 1998 and JP2004-319914 A). In this method, a film formed on a surface of the substrate (for example, a dielectric film such as $SiN_x$) can promote or prohibit vacancy diffusion due to a heat treatment. For example, by forming a film preventing vacancy diffusion and a film promoting it in predetermined regions on the surface of the epitaxial layer, only the region in which the diffusion is promoted can have a wider band gap (i.e., transparent). IFVD is also applicable to quantum wells on an InP substrate (such as AlGaInAs quantum wells and GaInAsP quantum wells).

Figure 8A:
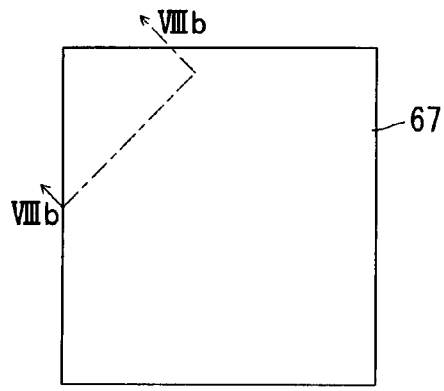
FIGS. 8A to 8H show steps of another example of a method of manufacturing the first laser gyro of the present invention.
Figure 8B:
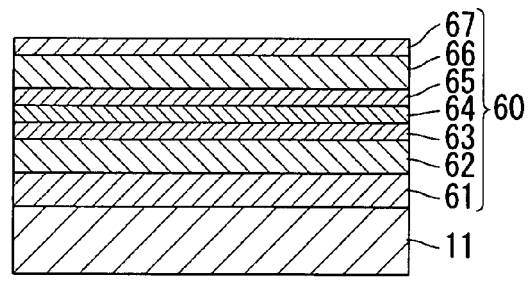

A method using Si diffusion for forming a ring laser employed for the gyro of the present invention is illustrated with reference to FIGS. 8A to 8H and FIGS. 9A to 9G. FIGS. 8A to 9G show only the semiconductor laser device part of the gyro and the other parts are omitted from the drawings. FIG. 8A is a top view, and FIG. 8B is a cross-sectional view taken along the line VIIIb-VIIIb in FIG. 8A. Similarly, FIGS. 8C, 8E, 8G, 9A and 9C are top views, and FIGS. 8D, 8F, 8H, 9B and 9D are cross-sectional views of these. FIG. 9E is a top view, and FIGS. 9F and 9G are cross-sectional views of it.

First, as shown in FIGS. 8A and 8B, a multilayer film 60 including a strained quantum well active layer is formed on a substrate 11. In specific, firstly, an n-GaAs buffer layer 61 (amount of n-type dopant: $1 \times 10^{18}$ cm$^{-3}$, thickness: 0.3 μm), an n-$Al_{0.35}Ga_{0.65}As$ clad layer 62 (amount of n-type dopant: $1 \times 10^{17}$ cm$^{-3}$, thickness: 3 μm), an undoped $Al_{0.2}Ga_{0.8}As$ optical waveguide layer 63 (thickness: 50 nm), a strained quantum well active layer 64, an undoped $Al_{0.2}Ga_{0.8}As$ optical waveguide layer 65 (thickness: 50 nm), a p-$Al_{0.35}Ga_{0.65}As$ clad layer 66 (p-type dopant: $1\times10^{18}$ $cm^{-3}$, thickness: 2 μm) and a $p^+$-GaAs contact layer 67 (p-type dopant: $2\times10^{19}$ $cm^{-3}$, thickness: 500 nm) are grown in this order by MOCVD on the substrate 11 made of n-GaAs. The active layer 64 is a double quantum well active layer constructed by a well layer made of $Ga_{0.82}In_{0.18}As$ (thickness: 5 nm) and a barrier layer made of GaAs (thickness: 10 nm).

Figure 8C:
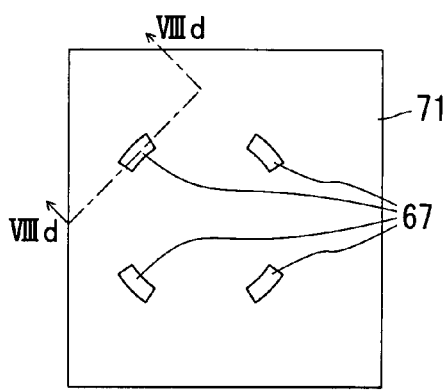
Figure 8D:
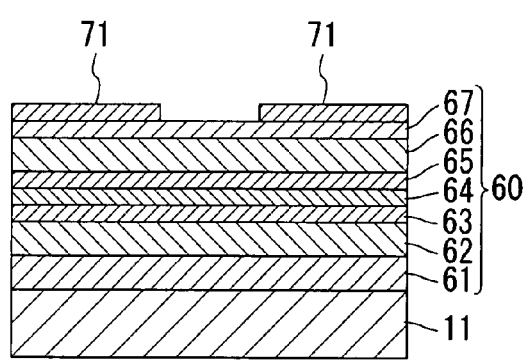

Next, as shown in FIGS. 8C and 8D, an Si film 71 is formed in the region in which Si is to be diffused. The Si film 71 is formed in the following procedure. Firstly, the region not to be subjected to the Si diffusion, which is the parts to be active regions when the device is completed, is covered by resist patterns. Then, an Si film (thickness: 20 nm) to be a diffusion source is stacked on a surface of the layered film by a technique such as electron-beam evaporation. After that, by removing the resist patterns using acetone, the Si film on the active regions is removed together with the resist (a lift-off process). In this way, the Si film 71 can be formed in which the contact layer 67 is exposed in predetermined regions.

Figure 8E:
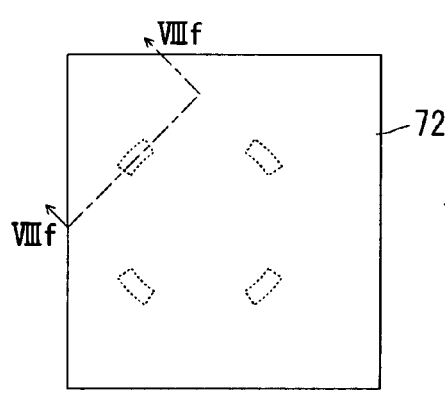
Figure 8F:
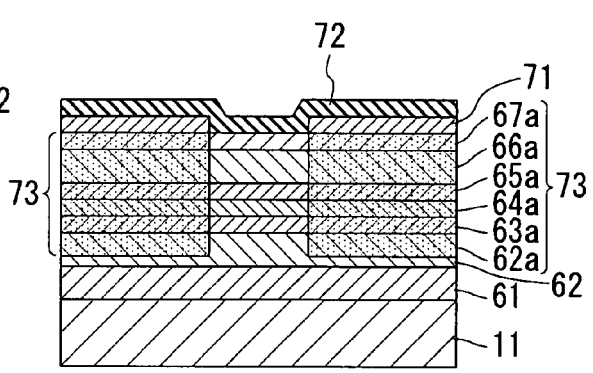

Then, an $SiO_2$ film 72 is formed on the entire surface of the layered film by plasma CVD. After that, the entire substrate on which the layered film formed is heat treated in a nitrogen atmosphere at a temperature of 850° C. for about eight hours. Si diffuses from the Si film 71 into the inside of the layered film by this heat treatment. As a result, as shown in FIGS. 8E and 8F, a part of the layered film turns an Si diffusion region 73. Specifically, as shown in FIG. 8F, Si diffuses in a part of the clad layer 62, the optical waveguide layer 63, the active layer 64, the optical waveguide layer 65, the clad layer 66 and the contact layer 67, and they turns into a clad layer 62a, an optical waveguide layer 63a, an active layer 64a, an optical waveguide layer 65a, a clad layer 66a and a contact layer 67a, respectively.

Here, whereas the photoluminescence emission wavelength of the region in which Si is not diffused due to the absence of the Si film 71 on the surface is 980 nm, the photoluminescence emission wavelength of the Si diffusion region 73 is about 930 nm, which means the band gap becomes wider by the Si diffusion. A part of this Si diffusion region 73 makes the passive regions. In addition, another part of the Si diffusion region 73 can be used as the optical waveguide for extracting light.

Figure 8G:
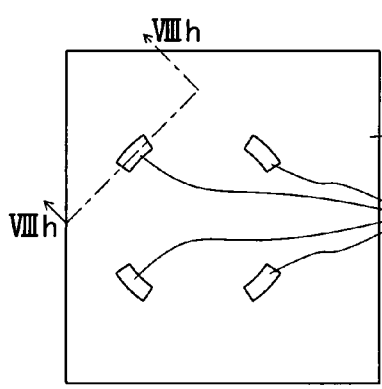
Figure 8H:
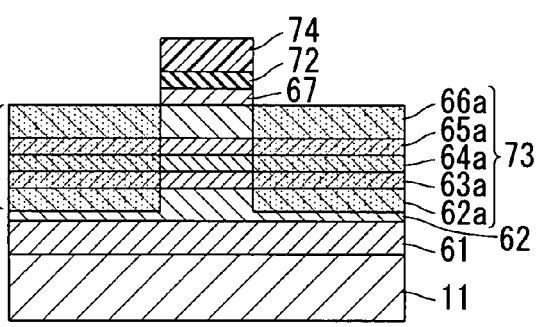

Subsequently, a photoresist film 74 is formed to cover the parts to be active regions (the parts in which Si is not diffused), the $SiO_2$ film 72 is removed by RIE using $CF_4$ gas in the region where the photoresist film 74 is not formed. Then, the Si film 71 and the contact layer 67a are removed by ICP-RIE using chlorine gas in the region where the photoresist film 74 is not formed. In this way, the structure shown in FIGS. 8G and 8H is formed.

Figure 9A:
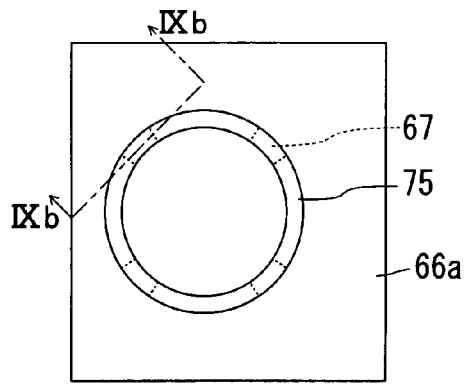
FIGS. 9A to 9G show steps following FIG. 8H.
Figure 9B:
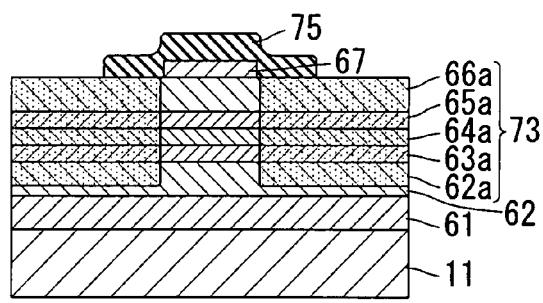

Subsequently, the photoresist film 74 is removed by RIE using oxygen gas, and the $SiO_2$ film 72 is removed by RIE using $CF_4$ gas. Then, as shown in FIGS. 9A and 9B, an $SiN_x$ film 75 is formed in a region where a ring-shaped resonator is to be formed. The $SiN_x$ film 75 can be formed by forming an $SiN_x$ film on the entire surface of the layered film, followed by patterning that film in a photolithography-etching process.

Figure 9C:
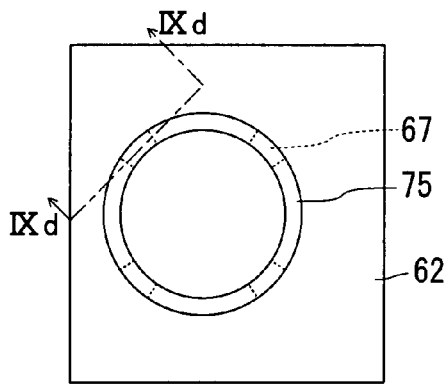
Figure 9D:
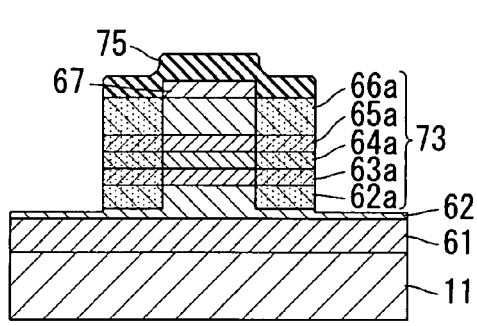
Figure 9E:
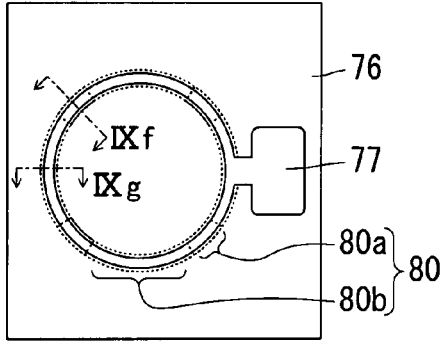
Figure 9F:
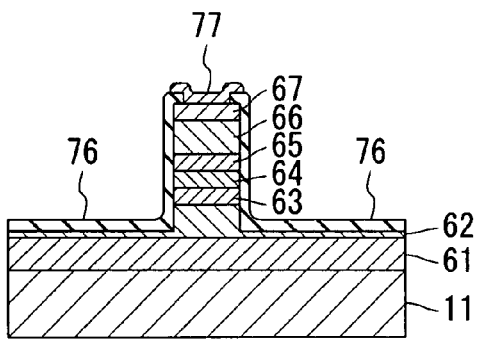
Figure 9G:
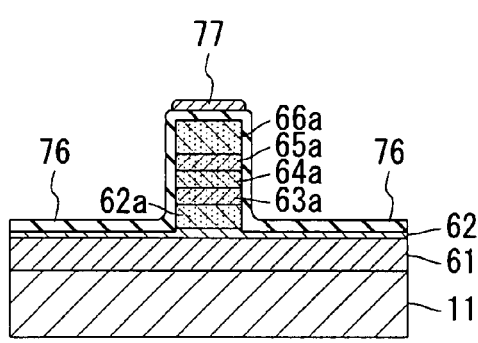

Subsequently, the layered film in the region where the $SiN_x$ film 75 is not formed is etched by ICP-RIE using chlorine gas until reaching the clad layer 62. In this way, a ring-shaped resonator (an optical waveguide) is formed as shown in FIGS. 9C and 9D.

Then, an $SiN_x$ film 76 having openings formed over the active regions is formed. Subsequently, an electrode 77 in a shape shown in FIG. 9E is formed by a lift-off process to cover the formed openings. The electrode 77 is formed by depositing Ti/Pt/Au by electron-beam evaporation, followed by lifting off unnecessary parts. The electrode 77 includes a pad portion (size: about 100 μm square) for bonding a wire for wiring.

A ring-shaped resonator 80 is constructed by four active regions 80a and four passive regions 80b. FIG. 9F shows a cross-sectional view in one of the active region 80a (a cross-sectional view taken along the line IXf in FIG. 9E). FIG. 9G shows a cross-sectional view in the passive region 80b (a cross-sectional view taken along the line IXg in FIG. 9E). The electrode 77 contacts with the semiconductor layer (the contact layer 67) only at the openings formed in the active regions 80a. Accordingly, the electrode 77 does not make contact with the semiconductor layer in the passive regions 80b.

Subsequently, the backside of the substrate 11 is polished until the thickness of the substrate 11 becomes about 150 μm. Then, a backside electrode having an AuGeNi/Au structure is formed on the backside of the substrate 11. In this way, a semiconductor laser device having a ring-shaped resonator is formed. The coupling means and the photodetector both same as those shown in FIG. 5 are disposed on the substrate 11, though not shown in the drawing. The optical waveguide as the coupling means can be formed in the same manner as the passive regions. In this way, a ring laser gyro is formed.

It should be noted that Si may be diffused by ion implantation or by high concentration dope during the epitaxial growth.

[Second Laser Gyro]

The second laser gyro (optical gyro) of the present invention includes a circular ring-shaped optical waveguide formed on a substrate, an optical coupler (optical coupling means) formed on the substrate, a semiconductor optical amplifier (SOA) and a photodetector disposed on the substrate. From another perspective, the laser gyro of the present invention includes a substrate and a Planar Lightwave Circuit (PLC) formed on the substrate. All or a major part of the planar lightwave circuit is formed by a process of manufacturing a semiconductor device. Thus, a substrate suitable for carrying out the process of manufacturing a semiconductor device is selected for the substrate. For example, the substrate employs a single crystal silicon substrate. The silicon substrate also functions as a heatsink for heat release for a semiconductor optical amplifier disposed on the substrate. Accordingly, a silicon substrate is preferable for cost reduction. Other than a silicon substrate, a GaAs substrate and a substrate of InP or the like may be used as well as a substrate made of a material such as AlN and $Al_2O_3$.

The semiconductor optical amplifier is coupled to the circular ring-shaped optical waveguide to form a circular ring-shaped path (optical path) with the optical waveguide.

The semiconductor optical amplifier and the circular ring-shaped optical waveguide form a ring resonator and generate a first laser light propagating clockwise in the circular ring-shaped optical path and a second laser light propagating counterclockwise in the optical path. For the semiconductor optical amplifier, for example, a layered structure can be applied which has the same structure as a semiconductor laser device with linear cavity. The cavity of the semiconductor optical amplifier and the optical waveguide form a circular ring-shaped optical path.

The semiconductor optical amplifier (SOA) and the optical waveguide are coupled so that the core center of the optical waveguide is almost matching to the mode field center of the semiconductor optical amplifier. There may be a space of from some μm to tens of microns between the semiconductor optical amplifier and the optical waveguide. In order to prevent the lowering in the coupling efficiency due to such space, a mode field conversion region is preferably formed on two end faces of the cavity of the semiconductor optical amplifier. For example, a semiconductor optical amplifier may be used which has an active layer widening gradually at each neighboring area of the two end faces of the cavity.

The structure of the semiconductor optical amplifier is not particularly limited as long as the effects of the present invention can be obtained. For example, a semiconductor optical amplifier can be used which has an active layer made of a group III-V semiconductor using a group III element such as Al, Ga and In and a group V element such as N, P and As. Specifically, a semiconductor optical amplifier may be used which is made of a group III-V semiconductor including In and P or a group III-V semiconductor including Ga and As. An example of the semiconductor optical amplifier includes two electrodes, two clad layers disposed between the electrodes and an active layer disposed between the clad layers.

The optical waveguide is constructed by a core layer formed in a circular ring shape with certain width and thickness and a clad layer formed to cover the circumference of the core layer. Although the width, thickness and length of the core layer are not particularly limited, the width and thickness of the core layer are preferably designed to be in a fundamental mode that prevents a higher order mode. The width, thickness and length of the core layer are preferably determined based on refractive indices and oscillation wavelengths of the core layer and the clad layer. The length of the optical waveguide constructing the ring resonator (the length of the core layer) affects the detection sensitivity to a gyro signal, and the sensitivity is lowered with the length being shortened. For this reason, the length of the optical waveguide may be $2\pi$ mm or more.

Since the laser light is confined in the core layer, the clad layer is made of a material having a smaller refractive index, at the wavelength of the laser light, than that of the core layer. A known combination may be applied for an example of the combination of the core layer/the clad layer, for example a combination of a Ge doped $SiO_2$ layer/an $SiO_2$ layer on the Si substrate or a polyimide layer/a Teflon® layer may be applied. In addition, when the clad layer employs air, substances on the GaAs substrate such as GaAs/AlGaAs, (poly) Si, $Ta_2O_5.SiO_2$, SiN and the like may be applied for the core layer. The core layer is preferably formed by a material that absorbs the laser light emitted from the semiconductor optical amplifier as little as possible. For this reason, $SiO_2$ is preferable as a material for the core layer.

The optical coupler extracts first and second laser lights from a circular ring-shaped path (optical waveguide) and superimposes them. The optical coupler includes an optical waveguide that extracts the first and the second laser lights from the circular ring-shaped path (optical waveguide) and that superimposes them. Although the optical waveguide included in the optical coupler is not in a circular ring shape, the layered structure may be the layered structure same as the circular ring-shaped optical waveguide mentioned above.

The optical waveguide of the optical coupler is formed so that the first and the second laser lights propagate from the circular ring-shaped optical waveguide to the optical waveguide of the optical coupler. In an example of the optical coupler, a part of the core layer in the optical waveguide of the optical coupler is disposed adjacent to and almost parallel to a tangential line of a part of the core layer in the circular ring-shaped optical waveguide. The shortest distance in this coupling part between the core layer in the circular ring-shaped optical waveguide and the core layer in the optical waveguide of the optical coupler is, for example, defined as about a several-fold of the oscillation wavelength or a distance less than that.

The optical coupler may be provided with, for example, a first directional coupler (first optical waveguide), a second directional coupler (second optical waveguide) and a third directional coupler. The first directional coupler is a coupler for extracting the first laser light circulating in the circular ring-shaped optical path. The second directional coupler is a coupler for extracting the second laser light. The third directional coupler is a coupler for coupling the first and the second laser lights that are extracted. These optical waveguides and directional couplers may be formed by disposing one optical waveguide in a predetermined position or by disposing a plurality of optical waveguides in predetermined positions.

The first laser light propagated in the first optical waveguide of the optical coupler and the second laser light propagated in the second optical waveguide of the optical coupler are coupled with the third directional coupler. In the third directional coupler, for example, a part of the first optical waveguide in which the first laser light travels and a part of the second optical waveguide in which the second laser light travels are formed to be adjacent to each other, to be almost parallel to each other and to make both the first and the second laser lights propagate in the same direction. In this coupling part, a part of the first laser light traveling in the first optical waveguide couples to the second optical waveguide, and a part of the second laser light traveling the second optical waveguide couples to the first optical waveguide. As a consequence, in the part closer to an end (the downstream side) of the optical waveguide from this coupling part, both the first and the second laser lights travel in the same waveguide towards the end (the downstream side). As a result, when there is a difference in frequency between the first and the second laser lights, a beat signal of them are observed.

When the system rotates, a difference is generated between the frequency of the first laser light and that of the second laser light by the Sagnac effect, and a beat signal is generated at an end of the optical coupler. The photodetector observes the beat signal generated by the superimposed first and second laser lights. This beat signal is measured as a change in the light intensity. The rotation angular velocity of the gyro can be obtained by measuring the change in the beat signal intensity.

The photodetector is disposed at a position where the beat signal generated by the two laser lights can be observed, for example it is disposed at an end of the optical waveguide in the downstream from the third directional coupler of the optical coupler. The photodetector is provided with one or more light-sensitive elements. For example, a photodiode or a phototransistor can be employed for the light-sensitive element. In order to facilitate the coupling to the optical waveguide, a waveguide-type photodiode is preferably employed. In this case, the photodiode is preferably disposed to make an end face of the waveguide of the photodiode oblique only in some degrees relative to the optical axis for preventing the laser light reflected at the end face of the photodiode from returning to the optical waveguide.

The photodetector may detect interference fringes generated by the two laser lights. In this case, the photodetector preferably includes a plurality of light-sensitive elements.

In the laser gyro of the present invention, the circular ring-shaped optical waveguide may be constructed by a multilayer film stacked on the substrate. In this case, the semiconductor optical amplifier and the photodetector may be disposed individually in concave portions, each concave portion formed by removing the multilayer film partially.

In the laser gyro of the present invention, the optical coupler may include one optical waveguide for optical coupling. This optical waveguide for optical coupling includes a first part, a second part and a third part disposed between the first and the second parts. The second part is disposed to be adjacent to and substantially parallel to the first part. The third part is disposed to be adjacent to the circular ring-shaped optical waveguide and parallel to a tangential direction of the circular ring-shaped optical waveguide.

In the laser gyro of the present invention, the optical coupler may include the first and the second optical waveguides for optical coupling. Both a part of the first optical waveguide for optical coupling and a part of the second optical waveguide for optical coupling may be disposed adjacent to the circular ring-shaped optical waveguide and parallel to tangential directions of the circular ring-shaped optical waveguide. In addition, another part of the first optical waveguide for optical coupling and another part of the second optical waveguide for optical coupling may be disposed adjacent to and substantially parallel to each other.

AN EXAMPLE OF LASER GYRO

Figure 10A:
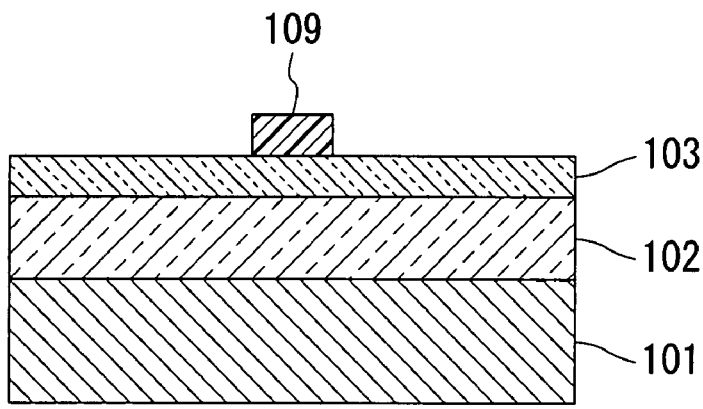
FIGS. 10A to 10C show an example of steps for manufacturing a second laser gyro of the present invention.

Hereinbelow, an example of a method of manufacturing the laser gyro of the present invention is described. First, a circular ring-shaped optical waveguide and an optical coupler are formed. FIGS. 10A to 13 show a process of manufacturing them. FIGS. 10A and 10C are cross-sectional views and FIG. 10B is a top view.

Firstly, as shown in FIG. 10A, a lower clad layer 102, a core layer 103 and a photoresist pattern 109 are formed on a single crystal silicon substrate 101. The lower clad layer 102 is an SiO$_2$ layer and the core layer 103 is a Ge doped SiO$_2$ layer.

The photoresist pattern 109 can be formed by standard photolithography. The core layer 103 having the same planar shape as the photoresist pattern 109 is formed by etching with the photoresist pattern 109 as a mask. The etching can be carried out by dry etching such as RIE (an example of the etching gas includes CF$_4$) or wet etching (an example of the etchant includes buffered hydrofluoric acid).

Figure 10B:
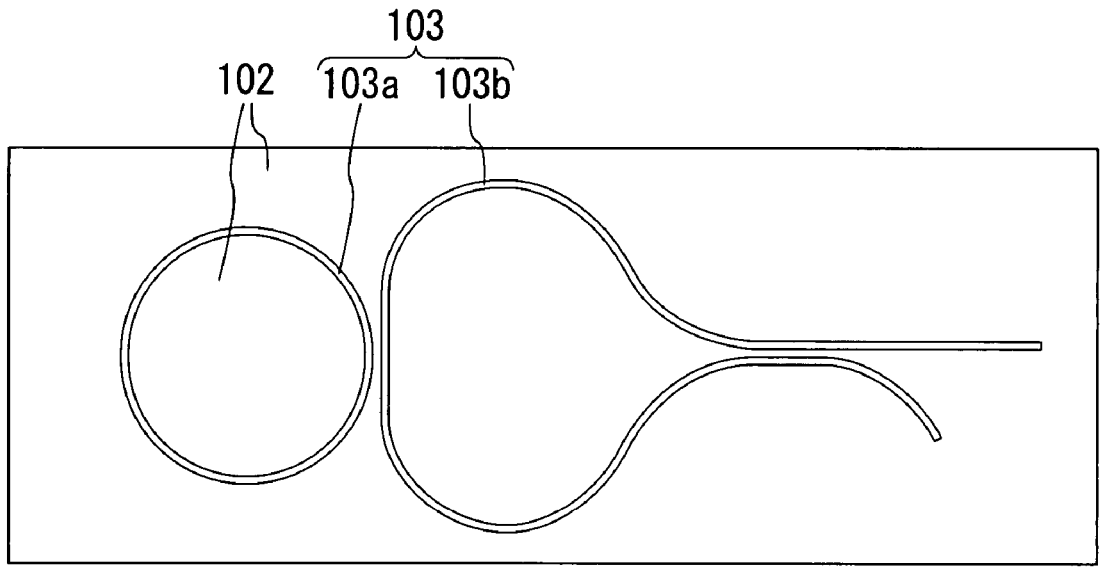
Figure 10C:
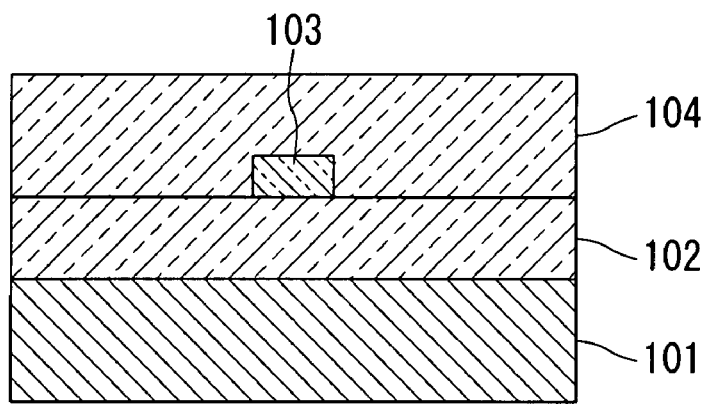

FIG. 10B shows the planar shape of the core layer 103 after etching. The core layer 103 includes a first core layer 103a to be a circular ring-shaped optical waveguide and a second core layer 103b to be an optical coupler. The first core layer 103a has a circular ring shape. The shape of the second core layer 103b is described later.

Next, as shown in FIG. 10C, an upper clad layer 104 (buried layer) is formed. The upper clad layer 104 is an SiO$_2$ layer same as the lower clad layer 102. The circumference of the core layer 103 is surrounded by the upper clad layer 104 and the lower clad layer 102. In this way, the optical waveguide constructed by the multilayer film (the lower clad layer 102, the core layer 103 and the upper clad layer 104) is formed.

The refractive index of the clad layers (the lower clad layer 102 and the upper clad layer 104) is assumed as, for example, 98.5% of that of the core layer 103. As a result, the laser light traveling in the core layer 103 is confined in the core layer 103 and the clad layer.

The lower clad layer 102, the core layer 103 and the upper clad layer 104 can be formed by a common method, such as Flame Hydrolysis Deposition and sputtering.

Figure 11A:
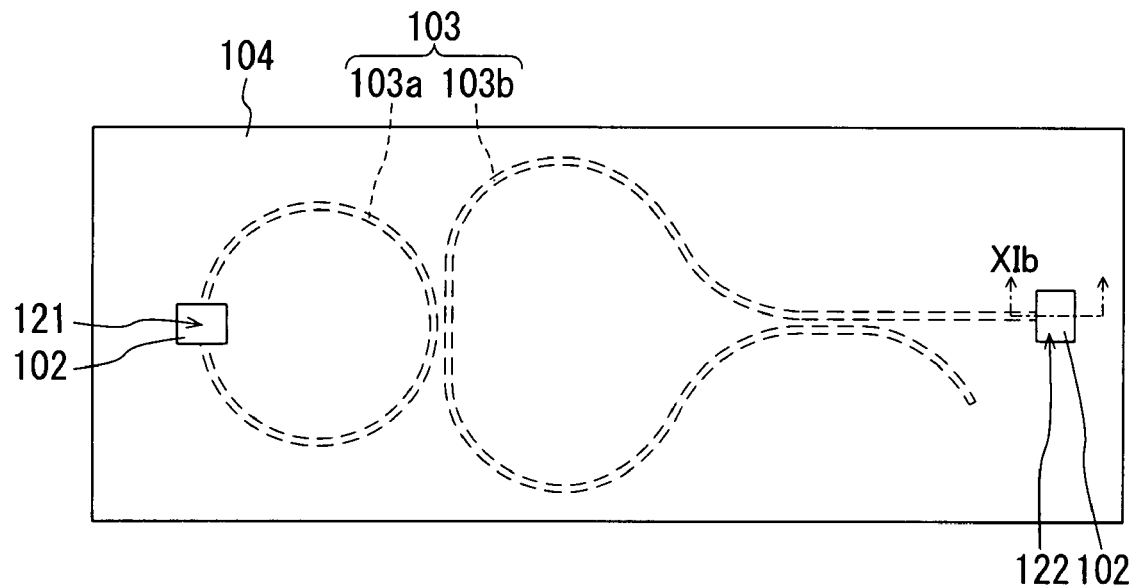
FIGS. 11A and 11B show steps following FIG. 10C.
Figure 11B:
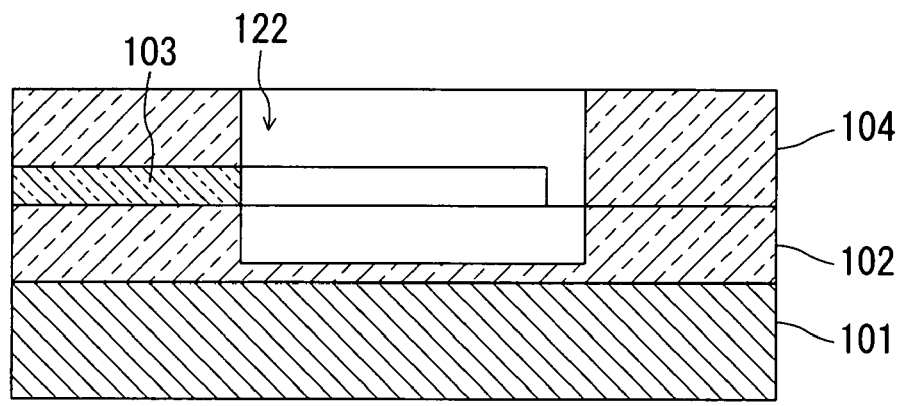

Subsequently, as shown in the plan view in FIG. 11A, two concave portions (windows 121 and 122) are formed for disposing the semiconductor optical amplifier (SOA) and the photodiode (photodetector). Specifically, by a photolithography-etching process, the multilayer film (the lower clad layer 102, the core layer 103 and the upper clad layer 104) is partly etched to form the windows 121 and 122. FIG. 11B shows a cross-sectional view of the part taken along the line XIb in FIG. 11A (at the window 122 part). The window 121 for disposing the semiconductor optical amplifier is formed in such a way that a part of the first core layer 103a not adjacent to the second core layer 103b is cut away partially. The window 122 for disposing the photodiode is formed in one end of the second core layer 103b.

The etching for forming the windows 121 and 122 can be carried out in the same way as the etching for the core layer 103. In this case, the etching is carried out through partway of the lower clad layer 102 or until reaching the substrate 101. It is more preferable to etch until reaching the substrate 101 on the point of heat release of the semiconductor optical amplifier. End faces of the optical waveguide of the core layer 103, that is the end faces exposed to the windows 121 and 122, are preferably inclined obliquely in some degrees relative to the optical axis of the optical waveguide. In order to reduce reflection at the end faces, anti-reflection coating (AR coating) may be applied to the end faces.

Figure 12A:
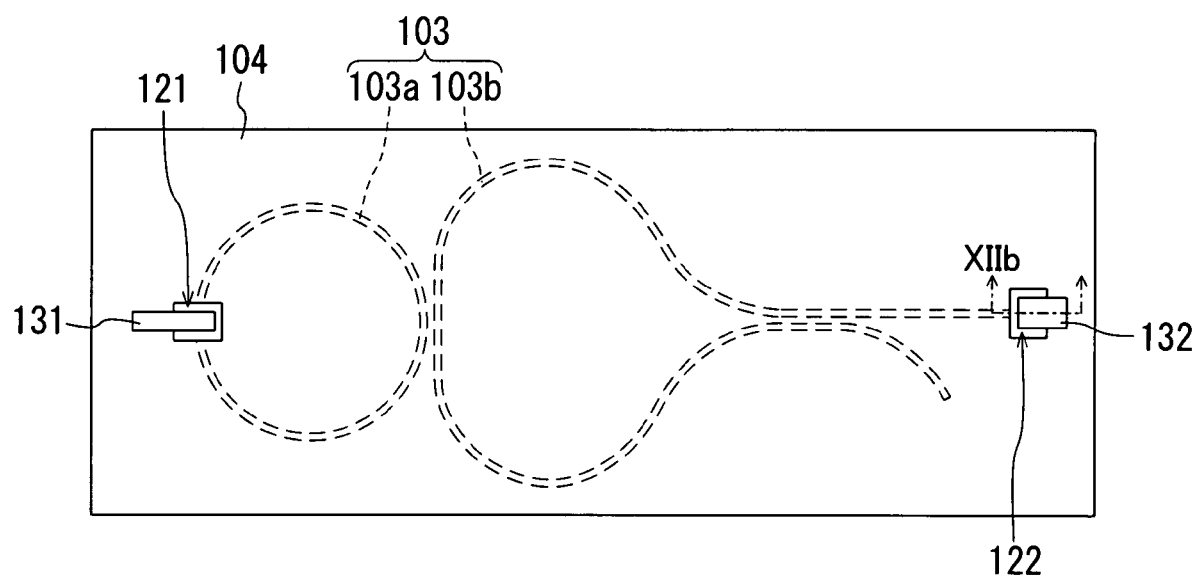
FIGS. 12A and 12B show steps following FIG. 11B.
Figure 12B:
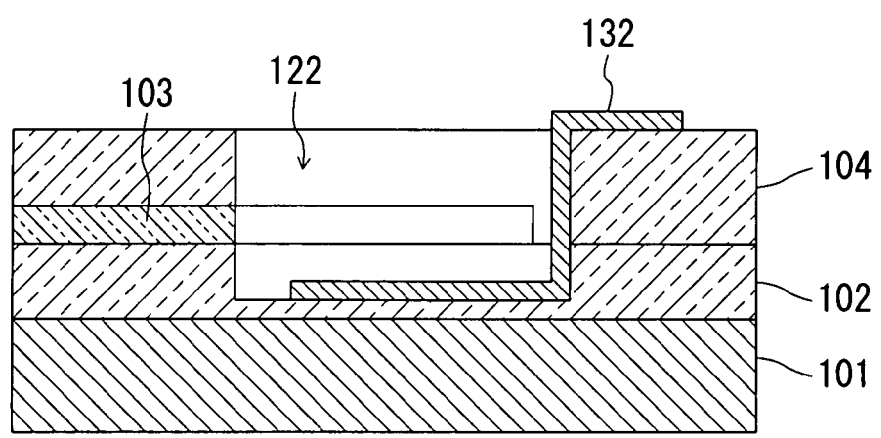

Subsequently, as shown in FIGS. 12A and 12B, an electrode 131 for injecting a current into the semiconductor optical amplifier is formed in the window 121 part. An electrode 132 for drawing output from the photodiode is formed in the window 122 part, as well. FIG. 12A is a plan view, and FIG. 12B is a cross-sectional view taken along the line XIIb in FIG. 12A. The electrodes 131 and 132 are formed by a lift-off process. The electrodes can employ, for example, a layered film stacked from the substrate 101 side in the order of a Ti layer/a Pt layer/an Au layer.

Figure 13:
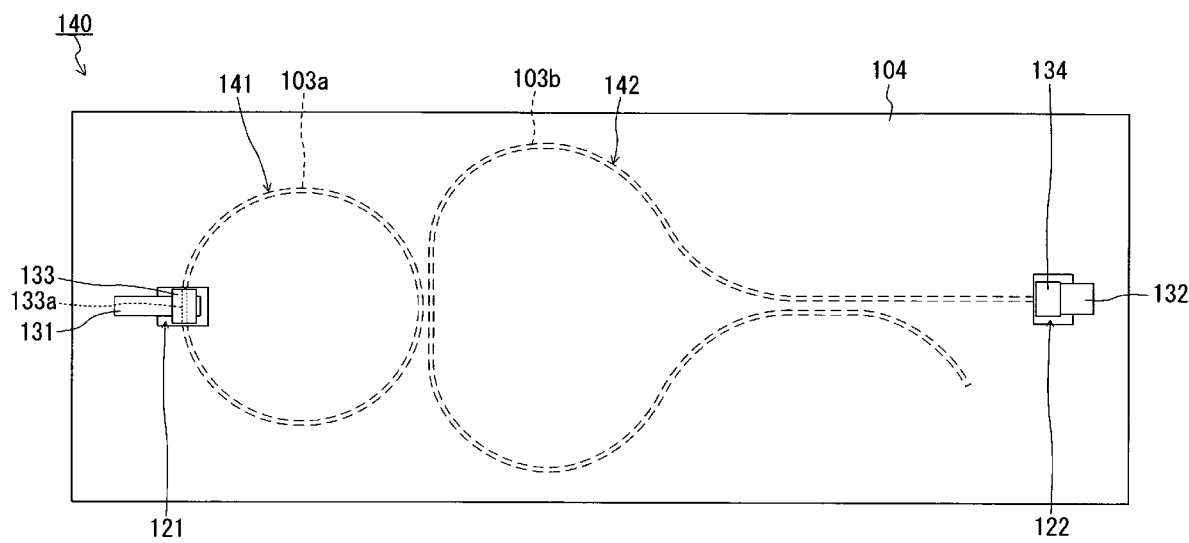
FIG. 13 is a top view schematically shows an example of the second laser gyro of the present invention.

Then, as shown in the plan view in FIG. 13, a semiconductor optical amplifier 133 is mounted on the electrode 131, and a photodiode 134 is mounted on the electrode 132. The semiconductor optical amplifier 133 has the layered structure same as that of the semiconductor laser device having linear cavity. The both end faces of the semiconductor optical amplifier 133 may have a window structure transparent to the oscillation wavelength.

The semiconductor optical amplifier 133 is mounted to make the cavity 133a optically couple to the first core layer 103a. The photodiode 134 is mounted to make the light-sensitive area optically couple to the second core layer 103b.

Figure 14:
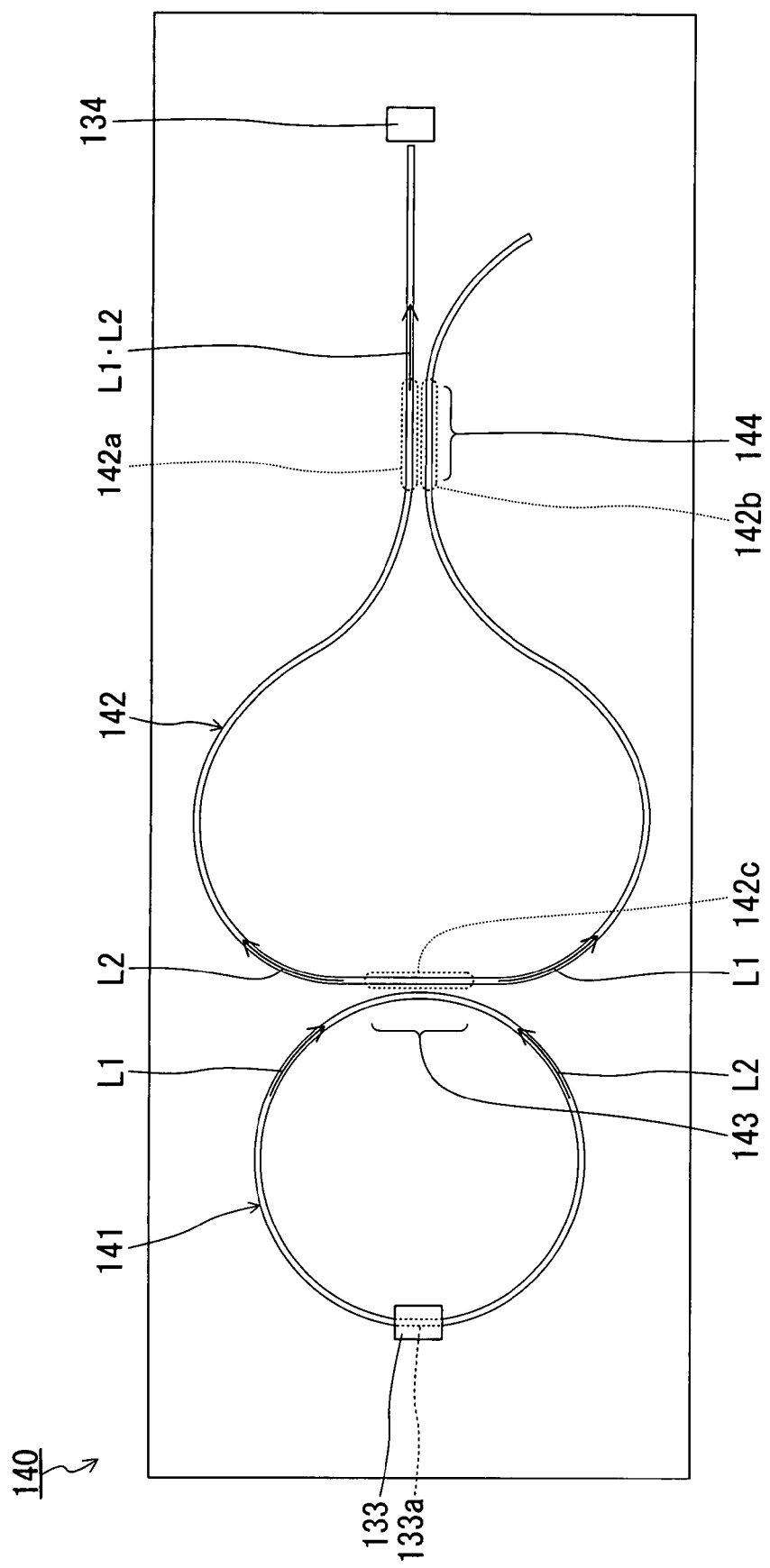
FIG. 14 shows functions of the laser gyro shown in FIG. 13.

In this way, a laser gyro 140 shown in FIG. 13 is formed. A circular ring-shaped optical path 141 is formed by the cavity 133a and the first core layer 103a of the semiconductor optical amplifier 133. The second core layer 103b constructs one optical waveguide 142 associated with the lower clad layer 102 and the upper clad layer 104. The optical waveguide 142 functions as an optical coupler. As shown in FIG. 14, the optical waveguide 142 includes a first part 142a, a second part 142b and a third part 142c. The second part 142b is disposed adjacent to and substantially parallel to the first part 142a. The third part 142c is disposed adjacent to the optical path 141 (circular ring-shaped optical waveguide) and parallel to a tangential direction of the optical path 141.

Hereinbelow, functions of the laser gyro 140 are described with reference to FIG. 14. It should be noted that the parts not necessary for description (such as the upper clad layer 104) are omitted from the drawing in FIG. 14.

By injecting a current into the semiconductor optical amplifier 133, a first laser light L1 circulating in the optical path 141 clockwise and a second laser light L2 circulating in the optical path 141 counterclockwise are excited.

The optical waveguide 142 couples to the optical path 141 in a first coupling region. The first coupling region 143 functions as a directional coupler for extracting the first laser light L1 and as a directional coupler for extracting the second laser light L2. Specifically, in the first coupling region 143, a part of the first laser light L1 circulating in the optical path 141 clockwise couples to the optical waveguide 142 for traveling in one direction in the optical waveguide 142. In addition, in the first coupling region 143, a part of the second laser light L2 circulating in the optical path 141 counterclockwise couples to the optical waveguide 142 for traveling in the opposite direction from the above direction in the optical waveguide 142.

The first coupling region 143 is formed in such a way that a small amount of the laser light (from 1% to 10%, for example) of the laser light traveling in the optical path 141 couples to the optical waveguide 142. In the first coupling region 143, the shortest distance between the optical path 141 (the first core layer 103a) and the optical waveguide 142 (the second core layer 103b) is, for example, 2 μm or thereabout.

In a second coupling region 144, a part of the first laser light L1 (about 50%, for example) traveling in the first part 142a in the optical waveguide 142 couples to another part, i.e., the second part 142b in the optical waveguide 142. A part of the second laser light L2 (about 50%, for example) traveling in the second part 142b in the optical waveguide 142 couples to the first part 142a in the optical waveguide 142. The shortest distance between the first part 142a and the second part 142b in the second coupling region 144 is, for example, 1 μm or thereabout.

The coupled two laser lights are emitted from the end face of the optical waveguide 142 (the end face exposed to the window 122) to be detected by the photodiode 134. When the frequencies of the laser light L1 and the laser light L2 are different, a beat signal is detected by the photodiode.

Figure 15:
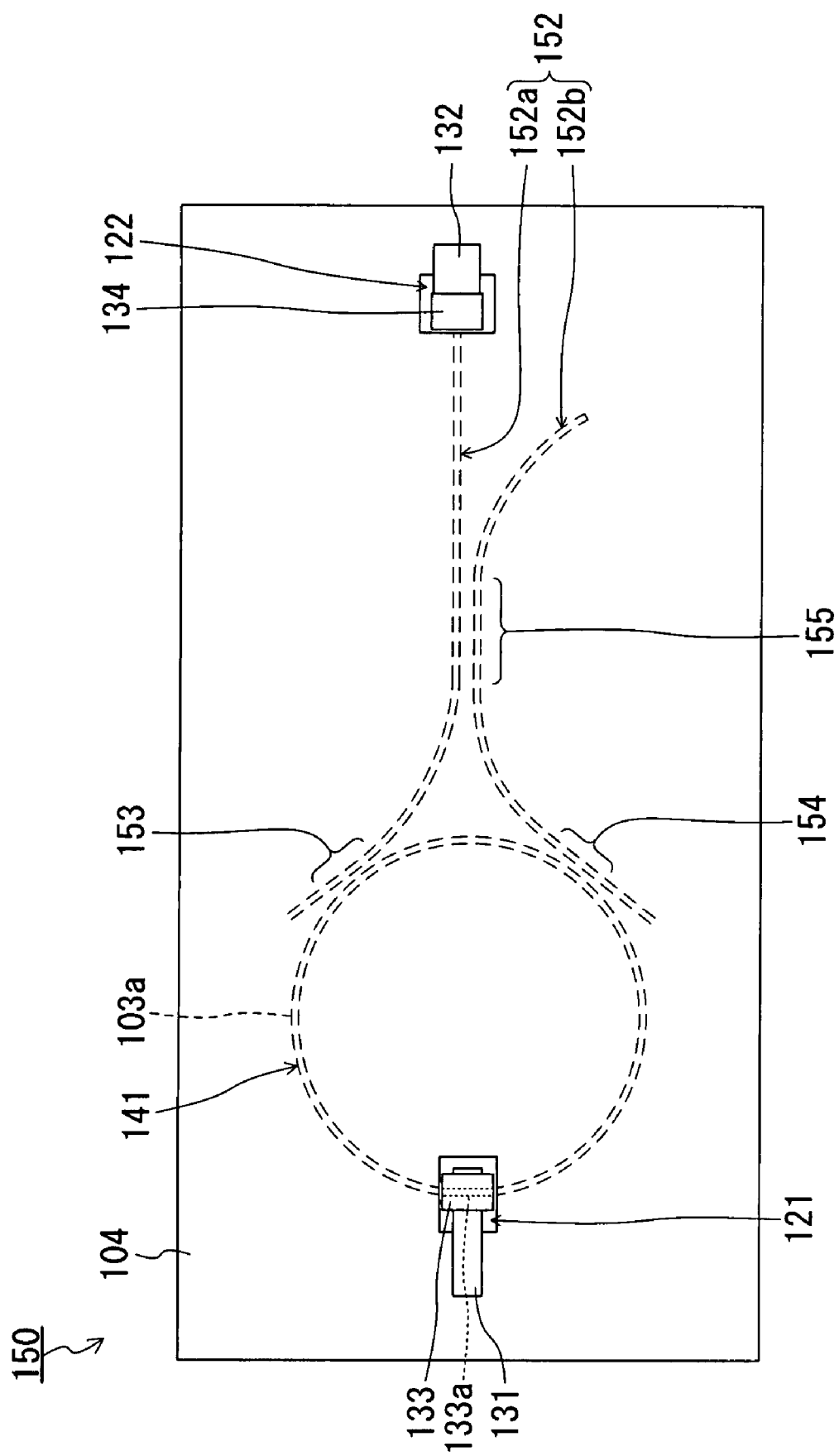
FIG. 15 is a top view schematically shows another example of the second laser gyro of the present invention.

Although an embodiment in which the laser lights L1 and L2 are extracted in one coupling region (the first coupling region 143) is described in the above example, the laser light L1 and the laser light L2 may be individually extracted in different coupling regions. FIG. 15 schematically shows a plan view of a construction of such laser gyro.

Because a laser gyro 150 in FIG. 15 is different only in the shape of an optical waveguide 142 from the laser gyro 140, repetitive description is omitted here. In the laser gyro 150, an optical waveguide 152 is used which is constructed by two optical waveguides 152a and 152b for optical coupling, instead of the optical waveguide 142. The optical waveguide 152 can be easily formed by etching the core layer 103 in a shape of the optical waveguide. A part of the optical waveguide 152a is disposed to be, in a first coupling region 153 adjacent to an optical path 141 (circular ring-shaped optical waveguide) and parallel to a tangential direction of the optical path 141. A part of the optical waveguide 152b is disposed to be, in a second coupling region 154, adjacent to the optical path 141 (circular ring-shaped optical waveguide) and parallel to a tangential direction of the optical path 141. Another part of the optical waveguide 152a and another part of the optical waveguide 152b are dispose to be, in a third coupling region 155, adjacent to and substantially parallel to each other.

The optical waveguide 152a couples to the optical path 141 in the first coupling region 153. The optical waveguide 152b couples to the optical path 141 in the second coupling region 154. The optical waveguides 152a and 152b couple to each other in the third coupling region 155. That is, each of the coupling regions 153 to 155 functions as a directional coupler. In the first coupling region 153, the first laser light L1 couples to the optical waveguide 152a. In the second coupling region 154, the second laser light L2 couples to the optical waveguide 152b. The laser lights L1 and L2 are coupled in the third coupling region 155. The beat signal of the coupled two laser lights is observed by a photodiode 134. In the laser gyro 150 as well as the laser gyro 140, the rotation angular velocity of the gyro can be obtained.

In the laser gyro of the present invention, various elements in a waveguide shape may be disposed in the middle of the waveguide. The semiconductor optical amplifier and/or the photodetector can be formed on the substrate using a semiconductor device manufacturing process, though causing complexity in a manufacturing process.

[Electronic Device]

The electronic device of the present invention includes the laser gyro of the present invention. The electronic device of the present invention is an apparatus required to detect rotation of an object, and typical examples include an attitude control system, a navigation system, a shake correction device and devices provided with them.

The gyro of the present invention can be applied to various apparatuses required to detect rotation of an object. As typical examples, it can be applied to an attitude control system, a navigation system and a shake correction device. Specifically, the gyro of the present invention can be used for aircrafts such as rockets and airplanes, and for means of transportation such as automobiles and motorbikes. In addition, taking advantage of the small size and the low power consumption, the gyro of the present invention can be used for personal digital assistants such as mobile phones and small personal computers, toys, cameras and the like.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes that come with the meaning and range of equivalency of the claims are intended to be embraced therein.

What is claimed is:

1. A laser gyro comprising:

a Si substrate;

laser light excitation means formed on the Si substrate and configured to excite first and second laser lights propagating in clockwise and counterclockwise directions in a circular ring-shaped path;

coupling means formed on the Si substrate, said coupling means formed of a $SiO_2$ multilayer film optical waveguide and configured to superimpose the first and the second laser lights; and a photodetector disposed on the Si substrate and configured to observe an interference signal generated by the superimposed first and second laser lights, wherein the laser light excitation means includes a circular ring-shaped optical waveguide formed of a $SiO_2$ multilayer film and a semiconductor optical amplifier coupled to the circular ring-shaped optical waveguide so that the semiconductor optical amplifier and the circular ring-shaped optical waveguide form the circular ring-shaped path, the coupling means includes an optical coupler configured to extract the first and the second laser lights from the ring-shaped path, and the semiconductor optical amplifier and the photodetector are disposed individually in concave portions, each concave portion being formed by removing the multilayer film partly.

2. The laser gyro according to claim 1,
wherein the semiconductor optical amplifier is provided with an active layer made of a group III-V semiconductor.

3. The laser gyro according to claim 1,
wherein the optical coupler includes one optical waveguide for optical coupling,
the optical waveguide for optical coupling includes a first part, a second part and a third part disposed between the first and the second parts,
the second part is disposed adjacent to the first part and substantially parallel to the first part, and
the third part is disposed adjacent to the circular ring-shaped optical waveguide.

4. The laser gyro according to claim 1,
wherein the optical coupler includes first and second optical waveguides for optical coupling,
both a part of the first optical waveguide for optical coupling and a part of the second optical waveguide for optical coupling are disposed adjacent to the circular ring-shaped optical waveguide, and
both another part of the first optical waveguide for optical coupling and another part of the second optical waveguide for optical coupling are disposed adjacent to and substantially parallel to each other.

5. An electronic device comprising the laser gyro according to claim 1.

* * * * *